US012103679B2

(12) United States Patent
Ushiro et al.

(10) Patent No.: US 12,103,679 B2
(45) Date of Patent: Oct. 1, 2024

(54) INFORMATION PROCESSING APPARATUS

(71) Applicant: NTT DOCOMO, INC., Tokyo (JP)

(72) Inventors: Tomoe Ushiro, Tokyo (JP); Naoki Kameyama, Tokyo (JP); Yuichiro Segawa, Tokyo (JP); Yasuhiro Kitamura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 227 days.

(21) Appl. No.: 17/617,646

(22) PCT Filed: Jun. 16, 2020

(86) PCT No.: PCT/JP2020/023547
§ 371 (c)(1),
(2) Date: Dec. 9, 2021

(87) PCT Pub. No.: WO2020/262105
PCT Pub. Date: Dec. 30, 2020

(65) Prior Publication Data
US 2022/0242559 A1 Aug. 4, 2022

(30) Foreign Application Priority Data

Jun. 27, 2019 (JP) .................. 2019-120211

(51) Int. Cl.
*B64C 39/02* (2023.01)
*B64C 19/02* (2006.01)
(Continued)

(52) U.S. Cl.
CPC .............. *B64C 39/02* (2013.01); *B64C 19/02* (2013.01); *B64D 47/02* (2013.01); *B64D 47/08* (2013.01);
(Continued)

(58) Field of Classification Search
CPC ....... B64C 39/02; B64C 39/024; B64C 19/02; B64D 47/02; B64D 47/08; E01C 23/01;
(Continued)

(56) References Cited

U.S. PATENT DOCUMENTS 11,009,894 B2 * 5/2021 Hiroi .................... G06T 7/60
11,417,088 B2 * 8/2022 Nishio .................. G06V 20/10
(Continued)

FOREIGN PATENT DOCUMENTS

| JP | 2015025727 A | 2/2015 |
| JP | 2018120409 A | 8/2018 |

(Continued)

OTHER PUBLICATIONS

International Search Report issued in corresponding PCT Application No. PCT/JP2020/023547, dated Sep. 8, 2020.
(Continued)

*Primary Examiner* — Timothy R Newlin
(74) *Attorney, Agent, or Firm* — Dilworth IP, LLC (57) ABSTRACT

An information processing apparatus includes a control unit that controls a first flying vehicle and a second flying vehicle. The first flying vehicle captures an image of a surface of a road. The second flying vehicle emits light onto the surface, such that a spot where a level difference is estimated, in advance, to occur on the surface, an image capturing direction in which the first flying vehicle captures an image of the spot, and a light emitting direction in which
(Continued)

the second flying vehicle emits the light onto the spot have a relationship that causes, when the level difference exists, a shadow to occur at the spot and the shadow to be captured.

4 Claims, 3 Drawing Sheets

(51) Int. Cl.
  *B64D 47/02* (2006.01)
  *B64D 47/08* (2006.01)
  *E01C 23/01* (2006.01)
  *G01C 7/04* (2006.01)
  *G03B 15/03* (2021.01)
  *G05D 1/00* (2006.01)

(52) U.S. Cl.
  CPC ............... *E01C 23/01* (2013.01); *G01C 7/04* (2013.01); *G03B 15/03* (2013.01); *G05D 1/101* (2013.01)

(58) Field of Classification Search
  CPC .......... G01C 7/04; G03B 15/03; G05D 1/101; G05D 1/0094; G05D 1/104; B64U 2101/30; B64U 2201/104; H04N 23/70; H04N 5/222; G08G 5/0043; G08G 5/0086; G08G 5/0091
  See application file for complete search history.

(56) References Cited

U.S. PATENT DOCUMENTS

| | | | |
|---|---|---|---|
| 2006/0274930 A1* | 12/2006 | Laurent | G01C 7/04 |
| | | | 382/141 |
| 2017/0240280 A1* | 8/2017 | Karabed | B64C 39/024 |
| 2017/0283088 A1 | 10/2017 | Sabe et al. | |
| 2017/0313416 A1* | 11/2017 | Mishra | B64D 47/08 |
| 2017/0336806 A1* | 11/2017 | Blanc-Paques | G01R 29/085 |
| 2018/0273201 A1 | 9/2018 | Sabe et al. | |
| 2020/0041261 A1* | 2/2020 | Bernstein | A61B 90/30 |
| 2020/0369385 A1* | 11/2020 | Thörn | B64C 39/024 |
| 2020/0410873 A1* | 12/2020 | Tachiiwa | G05D 1/104 |
| 2021/0034075 A1* | 2/2021 | Daniel | G06Q 10/04 |
| 2022/0253973 A1* | 8/2022 | Kominami | G06T 3/4038 |
| 2022/0399936 A1* | 12/2022 | Arksey | G08G 5/0039 |

FOREIGN PATENT DOCUMENTS

| | | |
|---|---|---|
| WO | 2016059877 | 4/2016 |
| WO | 2017169516 A1 | 10/2017 |

OTHER PUBLICATIONS

Notice of Reasons for Refusal issued in corresponding Japanese Patent Application No. 2021-528256, dated Apr. 19, 2022.

* cited by examiner

INFORMATION PROCESSING APPARATUS

TECHNICAL FIELD

The present invention relates to a technique for controlling a flying vehicle.

BACKGROUND

Before reopening a road to traffic after a disaster has occurred, the surface of the road needs to be inspected in order to confirm that there is no level difference of 5 cm or more, for example. Japanese Patent Application No. JP-2015-25727A discloses a technique for detecting a crack or the like in a road surface by using a road surface image capturing apparatus mounted on a vehicle to capture images of the road surface with infrared light while the vehicle travels, as a technique for this purpose, for example.

SUMMARY OF INVENTION

Incidentally, in recent years, unmanned flying vehicles called drones have become widespread, and therefore it is convenient if such an image capturing apparatus can be mounted on this type of unmanned flying vehicle for inspecting a road surface. However, images are captured by an unmanned flying vehicle in an outdoor environment in which various weather conditions are conceivable, and therefore cases are conceivable where whether or not a level difference has occurred in a road cannot be accurately detected depending on the image capturing conditions.

Accordingly, an object of the present invention is to more accurately detect a level difference that has developed in a road based on an image captured by a flying vehicle.

In order to solve the problem described above, the present invention provides an information processing apparatus including: a control unit that controls a first flying vehicle and a second flying vehicle, the first flying vehicle capturing an image of a surface of a road, the second flying vehicle emitting light onto the surface, such that a spot where a level difference is estimated, in advance, to occur on the surface, an image capturing direction in which the first flying vehicle captures an image of the spot, and a light emitting direction in which the second flying vehicle emits the light onto the spot have a relationship that causes, when the level difference exists, a shadow to occur at the spot and the shadow to be captured.

The control unit may control, when sunlight is at a predetermined amount or more, the first flying vehicle such that the spot, the image capturing direction in which the first flying vehicle captures the image of the spot, and a sunlight direction at the spot have a relationship that causes, when the level difference exists, a shadow to occur at the spot and the shadow to be captured, and the control unit may control, when the sunlight is at the predetermined amount or more, and control fails to be performed such that the spot, the image capturing direction in which the first flying vehicle captures the image of the spot, and the sunlight direction at the spot have the relationship that causes, when the level difference exists, the shadow to occur at the spot and the shadow to be captured, the first flying vehicle and the second flying vehicle such that the spot, the image capturing direction in which the first flying vehicle captures the image of the spot, and the light emitting direction in which the second flying vehicle emits the light onto the spot have the relationship that causes, when the level difference exists, the shadow to occur at the spot and the shadow to be captured.

The control unit may control, when the sunlight is at the predetermined amount or more, and the control fails to be performed such that the spot, the image capturing direction in which the first flying vehicle captures the image of the spot, and the sunlight direction at the spot have the relationship that causes, when the level difference occurs, the shadow to occur at the spot and the shadow to be captured, or when the sunlight is at less than the predetermined amount, an amount of the light emitted from the second flying vehicle to the spot in accordance with an amount of the sunlight or the sunlight direction at the spot.

The spot where the level difference is estimated, in advance, to occur on the surface may be a joint of a paved road surface.

The control unit may control the first flying vehicle and the second flying vehicle to fly along a flight path in a direction in which the road extends and subsequently controls the first flying vehicle and the second flying vehicle to fly along the flight path in an opposite direction.

According to the present invention, a level difference that has occurred in a road can be more accurately detected based on an image captured by a flying vehicle.

DETAILED DESCRIPTION

Configuration

Figure 1:
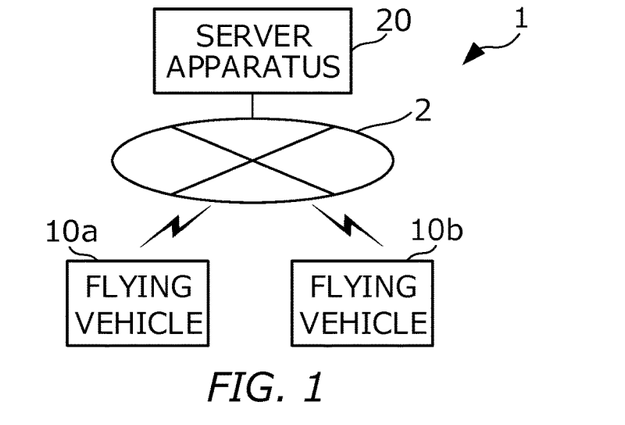
FIG. 1 is a diagram illustrating an example of a configuration of flight system in accordance with the present invention.

FIG. 1 is a diagram illustrating an example of a configuration of flight system 1. Flight system 1 includes unmanned flying vehicles 10a and 10b called drones, server apparatus 20, and communication network 2 for communicably connecting these apparatuses. Server apparatus 20 functions as an information processing apparatus for controlling flying vehicles 10a and 10b. Communication network 2 is a wireless communication network such as LTE (Long Term Evolution), for example. Flying vehicle 10 is a flying vehicle that can autonomously fly (so-called automatic pilot flight) under the control of server apparatus 20. Note that, in the following description, flying vehicle 10 indicates each of a plurality of flying vehicles.

Highways in a city center area may be structured so as to be elevated at high position from the ground (so-called elevated structure), for example. Level differences may occur at joints in paved road surfaces of these structures when a disaster such as an earthquake occurs. Therefore, it is conceivable that flying vehicle 10 is caused to fly to such a spot where it is estimated, in advance, that a level difference may occur, and flying vehicle 10 is caused to capture an image of the spot, and with this, the state of the level difference is detected based on whether or not a shadow has been generated at the level difference by sunlight and the size of the shadow.

However, there are cases where a shadow is unlikely to occur at a level difference depending on the sunlight direction and light amount. Therefore, while flying vehicle 10a (first flying vehicle) is equipped with a function of capturing a road surface, flying vehicle 10b (second flying vehicle) is equipped with a function of emitting light to the road surface, and a shadow is made at the level difference by light emitted from flying vehicle 10b, and the shadow is captured by flying vehicle 10a. Server apparatus 20 controls image capturing by flying vehicle 10a and light emission by flying vehicle 10b, along with controlling flights of these flying vehicles 10a and 10b. Specifically, server apparatus 20 controls flying vehicles 10a and 10b such that the relationship between the spot where it is estimated, in advance, that a level difference will occur in a road surface, the image capturing direction from flying vehicle 10a to the spot, and the light emitting direction from flying vehicle 10b to the spot is a relationship in which, when a level difference occurs, a shadow occurs at the spot, and the shadow can be captured.

Figure 2:
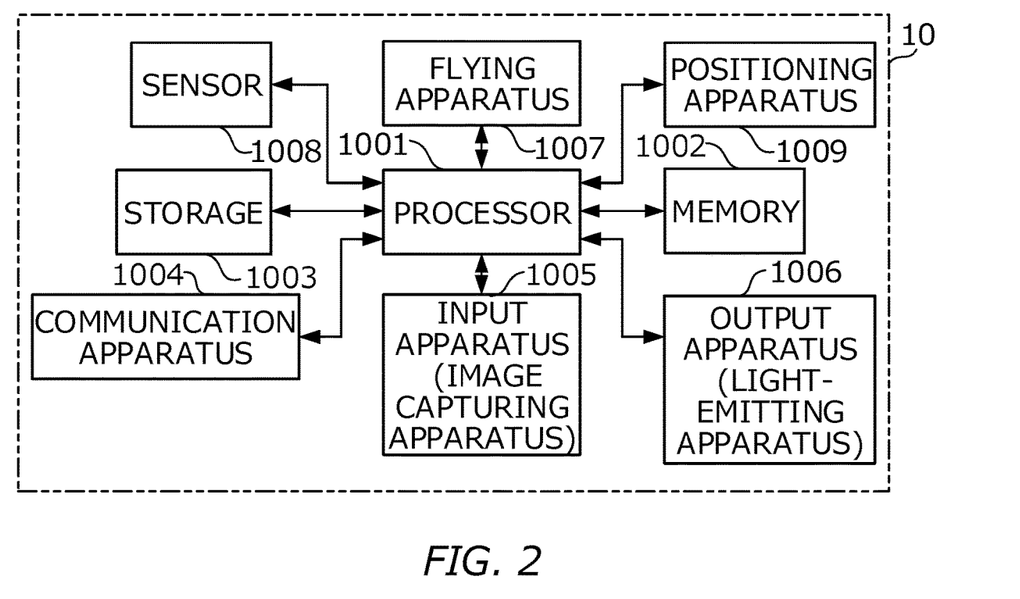
FIG. 2 is a diagram illustrating a hardware configuration of flying vehicle in accordance with the present invention.

FIG. 2 is a diagram illustrating a hardware configuration of flying vehicle 10. Physically, flying vehicle 10 is configured as a computer apparatus that includes processor 1001, memory 1002, storage 1003, communication apparatus 1004, input apparatus 1005, output apparatus 1006, flying apparatus 1007, sensor 1008, positioning apparatus 1009, a bus for connecting these apparatuses, and the like. These apparatuses operate using power supplied from a battery that is not illustrated. Note that, in the following description, the term "apparatus" can be replaced with "circuit", "device", "unit", or the like. The hardware configuration of flying vehicle 10 may also be configured to include, with respect to each apparatus shown in the diagram, one or a plurality of the apparatuses, or may also be configured to not include some apparatuses.

Functions of flying vehicle 10 are realized by causing predetermined software (programs) to be loaded on hardware such as processor 1001 and memory 1002 and processor 1001 performing computational operations to control communication by communication apparatus 1004, and to control at least one of reading and writing of data in memory 1002 and storage 1003.

Processor 1001 controls the computer as a whole by causing an operating system to run, for example. Processor 1001 may be constituted by a central processing unit (CPU) including an interface with peripheral apparatuses, a control apparatus, a computational operation apparatus, registers, and the like. Also, a baseband signal processing unit, a call processing unit, and the like may be realized by processor 1001, for example.

Processor 1001 reads a program (program code), a software module, data, and the like from at least one of storage 1003 and communication apparatus 1004 into memory 1002, and executes various processing according to the read-out program and the like. A program that causes a computer to execute at least some of the later-described operations is used as the program. The functional blocks of flying vehicle 10 may be realized by a control program that is stored in memory 1002 and runs in processor 1001. The various types of processing may be executed by one processor 1001, but may be executed simultaneously or sequentially by two or more processors 1001. Processor 1001 may be implemented using one or more chips. Note that a program may be transmitted from communication network 2 to flying vehicle 10 over an electrical communication line.

Memory 1002 is a computer-readable recording medium, and may be constituted by at least one of a ROM (Read Only Memory), an EPROM (Erasable Programmable ROM), an EEPROM (Electrically Erasable Programmable ROM), a RAM (Random Access Memory), and so on, for example. Memory 1002 may also be called a "register", "cache", "main memory" (a main storage apparatus), or the like. Memory 1002 can store an executable program (program code) for implementing a method according to the present embodiment, software modules, and the like.

Storage 1003 is a computer-readable recording medium, and for example, may be constituted by at least one of an optical disk such as a CD-ROM (Compact Disc ROM), a hard disk drive, a flexible disk, a magneto-optical disk (for example, a compact disk, a digital versatile disk, or a Blu-ray (registered trademark) disk), a smartcard, a flash memory (for example, a card, a stick, or a key drive), a Floppy (registered trademark) disk, a magnetic strip, and the like. Storage 1003 may be called as an auxiliary storage apparatus. Storage 1003 stores identification information of flying vehicle 10 (referred to as flying vehicle identification information), for example. This flying vehicle identification information is used by server apparatus 20 to control flying vehicle 10.

Communication apparatus 1004 is hardware (transmitting and receiving device) for performing communication between computers via communication network 2, and is also referred to as a network device, a network controller, a network card, and a communication module, for example. Communication apparatus 1004 may be constituted by a high frequency switch, a duplexer, a filter, a frequency synthesizer, and the like, in order to realize at least one of frequency division duplex (FDD) and time division duplex (TDD), for example. For example, a transmitting and receiving antenna, an amplifier unit, a transmitting and receiving unit, a transmission path interface, and the like may also be realized by communication apparatus 1004. The transmitting and receiving unit may be implemented by physically or logically separating the transmission control unit and the receiving unit.

Input apparatus 1005 is an input device (e.g., key, microphone, switch, button, and the like) for receiving input from an external apparatus, and in particular, input apparatus 1005 of flying vehicle 10a includes an image capturing apparatus for capturing images of a road surface. Output apparatus 1006 is an output device (e.g., display, speaker, LED lamp, and the like) for performing output to an external apparatus, and in particular, output apparatus 1006 of flying vehicle 10b includes a light emitting apparatus for emitting light onto a road surface.

Flying apparatus 1007 is a mechanism for flying vehicle 10 to fly in the air, and includes a propeller, a motor and a driving mechanism for driving the propeller, for example.

Sensor 1008 detects the state of flying vehicle 10, for example. Sensor 1008 includes a sensor group of a temperature sensor, a rotation speed sensor for detecting the number of rotations of a motor, a sensor for detecting a value regarding some kind of input/output such as current/voltage (e.g., a battery power remaining capacity sensor), a gyro-sensor, an acceleration sensor, an atmospheric pressure (altitude) sensor, a magnetic (direction) sensor, an ultrasonic sensor, an illuminance sensor, and the like.

Positioning apparatus 1009 measures the three-dimensional position of flying vehicle 10. Positioning apparatus 1009 is a GPS (Global Positioning System) receiver, for example, and measures the position of flying vehicle 10 based on GPS signals received from a plurality of satellites.

In the present embodiment, the position and attitude of flying vehicle 10 are specified by sensor 1008 and positioning apparatus 1009 mentioned above.

Apparatuses such as processor 1001 and memory 1002 are connected via a bus for communicating information. The bus may be constituted by a single bus, or may be constituted by a plurality of buses for connections between apparatuses.

Flying vehicle 10 may be constituted by hardware such as a microprocessor, a digital signal processor (DSP), an ASIC (Application Specific Integrated Circuit), a PLD (Programmable Logic Device), an FPGA (Field Programmable Gate Array), and the like, and some of or all of the functional blocks may be realized by the hardware. For example, processor 1001 may be implemented using at least one piece of hardware.

Figure 3:
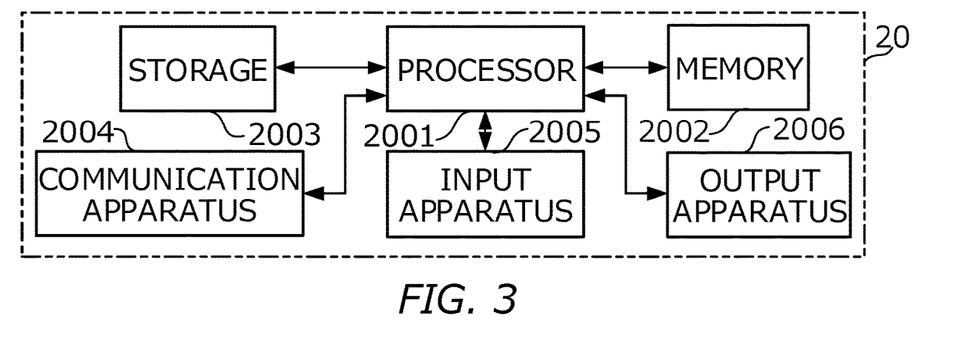
FIG. 3 is a diagram illustrating a hardware configuration of server apparatus in accordance with the present invention.

FIG. 3 is a diagram illustrating a hardware configuration of server apparatus 20. Physically, server apparatus 20 is configured as a computer apparatus that includes processor 2001, memory 2002, storage 2003, communication apparatus 2004, input apparatus 2005, output apparatus 2006, and a bus for connecting these apparatuses. Functions of server apparatus 20 are realized by causing predetermined software (programs) to be loaded on hardware such as processor 2001 and memory 2002, and processor 2001 performing computational operations to control communication by communication apparatus 2004, and to control at least one of reading and writing of data in memory 2002 and storage 2003. Processor 2001, memory 2002, storage 2003, communication apparatus 2004, and the bus for connecting these apparatuses are similar, as hardware, to processor 1001, memory 1002, storage 1003, communication apparatus 1004, and the bus for connecting these apparatuses that are described regarding flying vehicle 10, and therefore the description of these will be omitted. Input apparatus 2005 is an input device (e.g., keyboard, mouse, microphone, switch, button, sensor, joystick, ball controller, and the like) for receiving input from an external apparatus. Output apparatus 2006 is an output device (e.g., display, speaker, LED lamp, and the like) for performing output to an external apparatus. Note that input apparatus 2005 and output apparatus 2006 may be integrally configured (e.g., touch panel).

Figure 4:
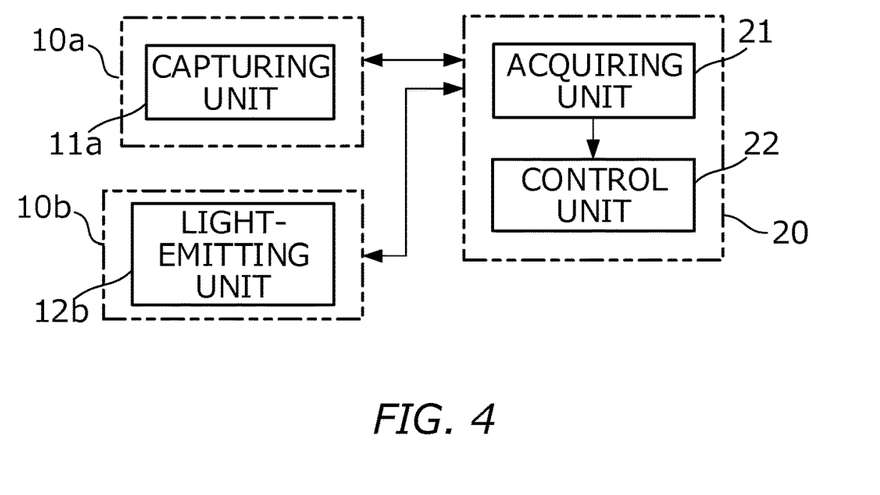
FIG. 4 is a diagram illustrating an example of a functional configuration of flight system in accordance with the present invention.

FIG. 4 is a diagram illustrating an example of a functional configuration of flight system 1. In flying vehicle 10a, capturing unit 11a captures an image of a road surface. In flying vehicle 10b, light-emitting unit 12b emits light onto a road surface.

In server apparatus 20, acquiring unit 21 acquires various types of data (e.g., various types of behavior data such as position and attitude of flying vehicles 10) from flying vehicles 10a and 10b via communication network 2.

In server apparatus 20, control unit 22 controls flying vehicles 10a and 10b such that the relationship between a spot where it is estimated, in advance, that a level difference will occur in a road surface (hereinafter, referred to as a "spot where occurrence of level difference is estimated"), the image capturing direction from flying vehicle 10a to the spot where occurrence of level difference is estimated, and the light emitting direction from flying vehicle 10b to the spot where occurrence of level difference is estimated is the relationship in which, when there is a level difference, a shadow occurs at the spot, and the shadow can be captured.

Here, the control content performed by control unit 22 on flying vehicles 10 differs between the case where a shadow generated at a level difference by sunlight can be captured, and the case where it is difficult to capture a shadow generated at a level difference by sunlight. First, when the amount of sunlight is at a predetermined level or more, flying vehicle 10a is controlled such that the relationship between the spot where occurrence of level difference is estimated, the image capturing direction from flying vehicle 10a to the spot where occurrence of level difference is estimated, and the sunlight direction relative to the spot where occurrence of level difference is estimated is the relationship in which, when there is a level difference, a shadow occurs at the spot where occurrence of level difference is estimated, and the shadow can be captured.

Figure 5:
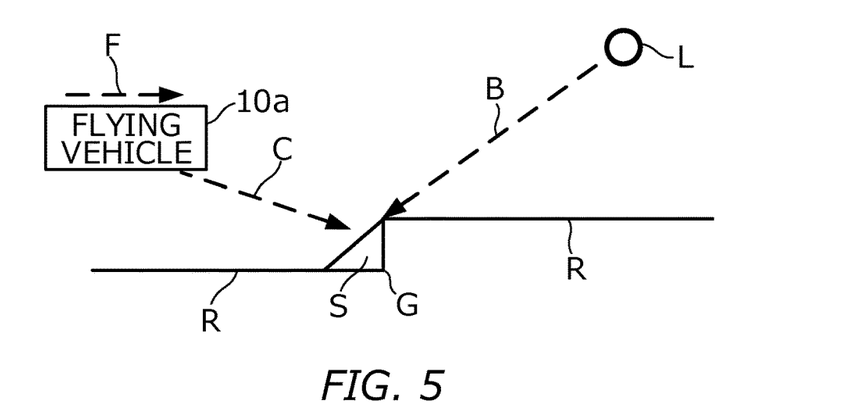
FIG. 5 is a diagram illustrating the relationship between road level difference, flying vehicle, and sun in accordance with the present invention.

As described above, the spot where occurrence of level difference is estimated is a joint in a road surface. Therefore, a level difference occurs such that the width direction of the road (direction orthogonal to a road extending direction) is the longitudinal direction thereof. Here, as illustrated in FIG. 5, it is assumed that, when flying vehicle 10a flies over a road in extending direction F of the road, and captures images, level difference G occurs in road surface R such that the level on a near side of flying vehicle 10a is low and the level on a far side thereof is high. In this case, if flying vehicle 10a and sun L are on opposite sides relative to the position of level difference G (that is, in the case where sunlight is so-called backlight or oblique light when capturing the level difference), flying vehicle 10a can capture an image of shadow S (triangular area in the diagram) that is generated at level difference G due to sunlight B.

Figure 6:
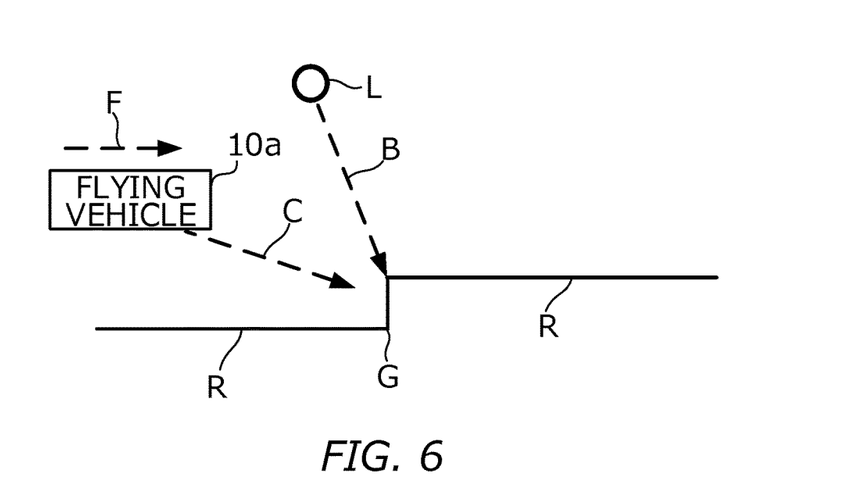
FIG. 6 is a diagram illustrating the relationship between road level difference, flying vehicle, and sun in accordance with the present invention.

On the other hand, as illustrated in FIG. 6, if flying vehicle 10a and sun L are on the same side viewed from the position of level difference G (that is, in the case where sunlight is so-called direct light when capturing the level difference), a shadow generated by sunlight B will not occur at level difference G.

When the amount of sunlight is at the predetermined level or more (that is, the amount of sunlight is at a level at which a shadow of a level difference is clear in a captured image), control unit 22 specifies the position of a spot where occurrence of level difference is estimated, the longitudinal direction of the level difference that is estimated from a road extending direction at the position of the spot where occurrence of level difference is estimated, the position and image capturing direction of flying vehicle 10a, and the position of the sun (direction and altitude) viewed from the spot where occurrence of level difference is estimated, and controls the flight and image capturing direction of flying vehicle 10a such that the relationship between the specified items is the relationship in which, when there is a level difference, a shadow occurs at the spot where occurrence of level difference is estimated, and the shadow can be captured.

Note that, as illustrated in FIG. 6, even if the amount of sunlight is at the predetermined level or more, there are cases where control cannot be performed such that the relationship between the spot where occurrence of level difference is estimated, the image capturing direction from flying vehicle 10a to the spot where occurrence of level difference is estimated, and the sunlight direction relative to the spot where occurrence of level difference is estimated is the relationship in which the shadow of the level difference can be captured (that is, in the case of direct light). Also, when the amount of sunlight is less than the predetermined level (that is, when it is cloudy, raining, or night time) as well, the shadow of a level difference will not be clear in a captured image. Therefore, in these cases, control unit 22 controls flying vehicles 10*a* and 10*b* such that the relationship between the spot where occurrence of level difference is estimated, the image capturing direction from flying vehicle 10*a* to the spot where occurrence of level difference is estimated, and the light emitting direction from flying vehicle 10*b* to the spot where occurrence of level difference is estimated is the relationship in which, when there is a level difference, a shadow occurs at the spot where occurrence of level difference is estimated, and the shadow can be captured. Specifically, control unit 22 arranges light-emitting unit 12*b* of flying vehicle 10*b* at the position of sun L in FIG. 5, in place of sun L, and controls the flight and light emission of flying vehicle 10*b* such that the light emitting direction is similar to that of sunlight B.

Here, control unit 22 controls the amount of light emitted from flying vehicle 10*b* to the spot where occurrence of level difference is estimated according to the amount of sunlight or the direction of sunlight to the spot where occurrence of level difference is estimated. Specifically, when the amount of sunlight is large, the amount of light from flying vehicle 10*b* to the spot where occurrence of level difference is estimated is increased, in order to create a shadow at the level difference without being influenced by the sunlight. Also, when the sunlight direction is a direction in which the likelihood a shadow will not be generated (so-called degree of direct light) is large at the spot where occurrence of level difference is estimated, the amount of light from flying vehicle 10*b* to the spot where occurrence of level difference is estimated is increased.

Note that, in the above description, it is assumed that, when flying vehicle 10*a* flies over a road in extending direction F of the road, and captures images, level difference G occurs in road surface R such that the level on a near side of flying vehicle 10*a* is low and the level on a far side thereof is high. On the other hand, there may be a case where the conditions are reversed, that is, a case where level difference G occurs such that the level on a near side of flying flying vehicle 10*a* is high and the level on a far side thereof is low. Envisioning such a case, after causing flying vehicle 10*a* and flying vehicle 10*b* to make an outgoing flight in the extending direction of the road, control unit 22 performs the control described above while causing flying vehicle 10*a* and flying vehicle 10*b* to make a return flight in a direction opposite to the previous flight path. Accordingly, the lighting conditions of direct light and backlight at the spot where occurrence of level difference is estimated is reversed between the outgoing flight and the return flight. That is, level difference G that is high on the near side of flying vehicle 10*a* and is low on the far side in the outgoing flight cannot be detected by a shadow in the outgoing flight, but can be detected in the return flight.

Note that the captured image is a still image, for example, and control unit 22 performs control such that image capturing by flying vehicle 10*a* is performed in synchronization with light emission by flying vehicle 10*b*. Also, when the captured image is a moving image, control unit 22 may cause flying vehicle 10*b* to continuously emit light while flying vehicle 10*a* captures a moving image, or may cause flying vehicle 10*b* to intermittently emit light while flying vehicle 10*a* captures a moving image. When light is intermittently emitted as in the latter case, the state of level difference may be detected based on whether or not a shadow is present or the size of the shadow in a frame image, in the moving image, that is shot at a timing corresponding to the timing at which light is emitted. Also, when images are captured, control unit 22 may perform control such that the speed and height of flying vehicles 10*a* and 10*b* are reduced while approaching the spot where occurrence of level difference is estimated, and image capturing processing is performed more frequently.

Operations

Next, the operations of server apparatus 20 will be described. Note that, in the following description, when server apparatus 20 is described as an agent of processing, specifically, it means that the processing is executed by processor 2001 performing computation in response to predetermined software (program) being loaded onto hardware such as processor 2001 and memory 2002, and controlling communication by communication apparatus 2004 and reading-out and/or writing of data in memory 2002 and storage 2003. The same applies to flying vehicle 10.

Figure 7:
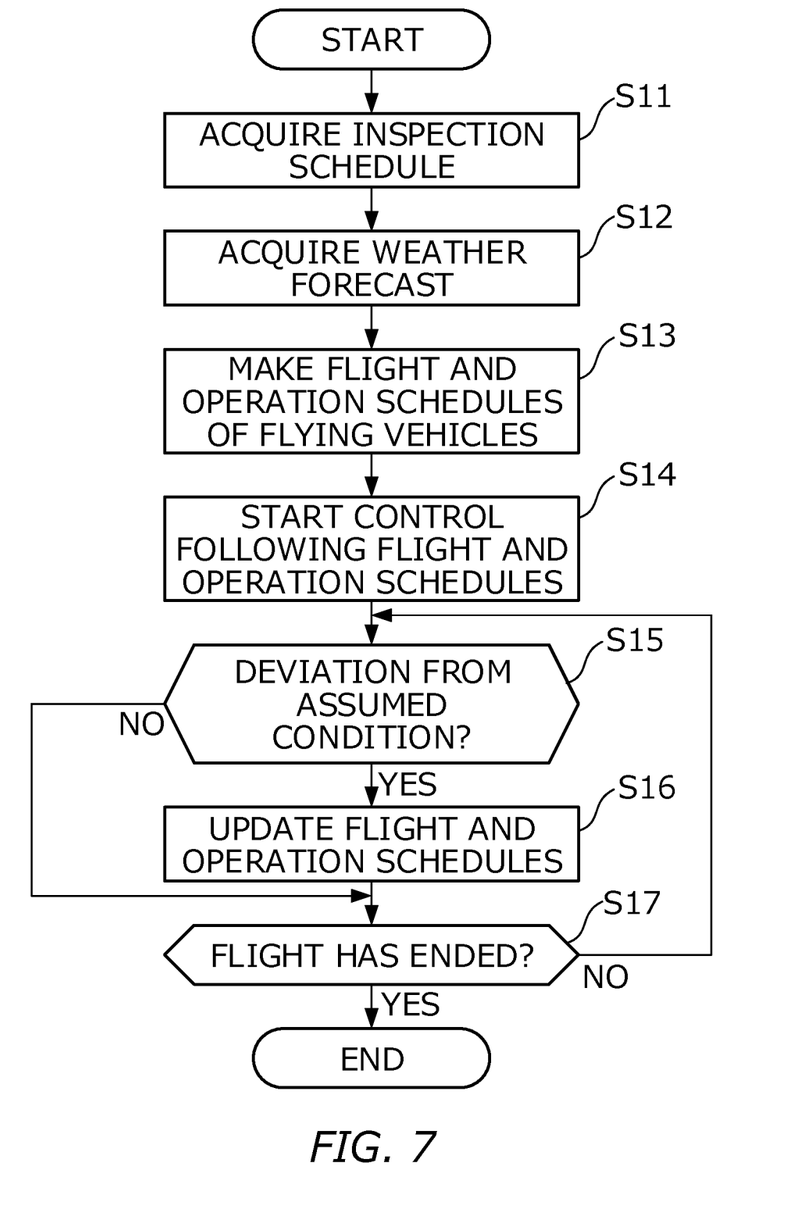
FIG. 7 is a flowchart illustrating an example of operations of server apparatus in accordance with the present invention.

In FIG. 7, control unit 22 of server apparatus 20 acquires an inspection schedule (step S11). The inspection schedule includes an inspection date of a road, the position of a road to be inspected, the position at which a level difference occurs, and the like, and is input to server apparatus 20 with a predetermined method.

Next, control unit 22 acquires the position of a road to be inspected and the weather forecast for the inspection day (step S12). The weather forecast is input to server apparatus 20 from a weather forecast providing apparatus via communication network 2, for example. With this, control unit 22 can estimate the position of the road to be inspected and the amount of sunlight on the inspection day.

Next, control unit 22 makes flight and operation schedules of flying vehicles 10 for inspecting whether or not there is a level difference in the road using information acquired in steps S11 and S12 (step S13). Specifically, control unit 22 generates flight paths for flying vehicles 10*a* and 10*b* making a flight from the departure and arrival base thereof to the road to be inspected and making a flight back and forth above the road in the road extending direction. Moreover, control unit 22 makes flight and operation schedules of flying vehicles 10*a* and 10*b* including the flight period, flight position, image capturing period, light emitting period, and light emitting direction when passing over the spot where occurrence of level difference is estimated on the flight path, based on the position of the sun, estimated amount of sunlight, position of flying vehicle 10*a*, and image capturing direction from flying vehicle 10*a* to the spot where occurrence of level difference is estimated. The flight and operation schedules are for realizing the positional relationship between flying vehicle 10*a*, the spot where occurrence of level difference is estimated, the sun, and flying vehicle 10*b*, as illustrated in FIG. 5 or 6.

Then, control unit 22 starts remote control of flying vehicles 10*a* and 10*b* following the flight and operation schedules that have been made (step S14).

Control unit 22 determines, while flying vehicles 10*a* and 10*b* are flying, whether or not the condition has deviated from the assumed condition when the flight and operation schedules were made (step S15). The case of deviating from the assumed condition is a case where the amount of sunlight unexpectedly increases and decreases against the weather forecast, for example. The amount of sunlight can be measured by an illuminance sensor of sensor 1008 of flying vehicle 10*a* or 10*b*, and therefore control unit 22 may acquire the measurement value via communication network 2.

Upon determining that the condition has deviated from the assumed condition of the flight and operation schedules (step S15; YES), control unit 22 makes flight and operation schedules under the new assumed condition (e.g., condition in which the measured amount of sunlight is considered) (step S16). This schedule-making processing is similar to the processing in step S13. The processing in steps S15 and S16 is repeated until the flight for road inspection is ended (step S17).

According to the embodiment described above, a level difference that has occurred in a road can be more accurately detected based on an image captured by a flying vehicle.

Modification

The spot where occurrence of level difference is estimated is not limited to a joint in a paved road surface, and need only be a spot where a level difference may occur in a road surface. Also, the wavelength region of light emitted from light-emitting unit 12b may be any wavelength region, and may be visible light or infrared light, for example. Capturing unit 11a need only be a unit that can capture an image according to the wavelength region of light emitted from light-emitting unit 12b.

Note that the block diagram used in the description of the above embodiment shows blocks of functional units. These function blocks (constituent units) are realized by any combination of at least one of hardware and software. The method of realizing each function block is not particularly limited. That is, each functional block may be realized by using one apparatus physically or logically coupled, or may be realized by directly or indirectly connecting two or more apparatus that are physically or logically separated (using, for example, a wired connection, a wireless connection, or the like), and using the plurality of these apparatus. Function blocks may also be realized by combining the one apparatus or the plurality of apparatus with software.

Examples of functions include determining, deciding, summing, calculating, processing, deriving, surveying, searching, confirming, receiving, transmitting, outputting, accessing, solving, selecting, setting, establishing, comparing, assuming, expecting, considering, broadcasting, notifying, communicating, forwarding, configuring, reconfiguring, allocating, mapping, assigning, and the like, but these are not limitations. For example, a functional block (constituent unit) that causes transmission to function is called a transmission control unit (transmitting unit) or a transmitter (transmitter). In any case, as described above, the method of realizing a function is not particularly limited.

For example, the server apparatus or the like in one embodiment of present disclosure may function as a computer that performs processing of present disclosure.

The modes/embodiment described in the present disclosure may be applied to at least one of a system that uses LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (new Radio), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), or another appropriate system, and a next-generation system that has been expanded based on the systems described above. Also, a plurality of systems may also be applied in a combined mode (e.g., combination between at least one of LTE and LTE-A and 5G).

The order of the processing procedures, sequences, flowcharts and the like of the modes/embodiment described in the present disclosure may be changed, as long as there are no inconsistencies. For example, with regard to the methods described in the present disclosure, the elements of various steps are presented using an illustrative order, and are not limited to the specific order in which they are presented.

Information and the like that has been input/output may be saved in a specific location (for example, a memory), or may be managed using a management table. The information and the like that is input/output can be overwritten, updated, or added to. Information and the like that has been output may be deleted. Information and the like that has been input may be transmitted to another apparatus.

Determination may be performed according to a value (0 or 1) represented by 1 bit, or may be performed according to a Boolean value (Boolean: true or false), or may be performed by comparing numerical values (for example, comparison with a predetermined value).

Although the present disclosure has been described in detail above, it will be evident to a person skilled in the art that the disclosure is not limited to the embodiment described in the disclosure. The present disclosure can be implemented as in revised and modified modes without departing from the spirit and scope of the disclosure which is defined by the description in the claims. Accordingly, the description of the present disclosure is intended as an illustrative description and does not have any restrictive meaning with respect to the disclosure.

Regardless of whether software is referred to as software, firmware, middleware, microcode, hardware description language, or by another name, "software" should be interpreted broadly as meaning commands, command sets, code, code segments, program code, programs, sub programs, software modules, applications, software applications, software packages, routines, subroutines, objects, executable files, execution threads, sequences, functions, and the like. Additionally, software, commands, and the like may be exchanged over a transmission medium. For example, when software is transmitted from a website, a server, or another remote source using hardwired technologies such as coaxial cable, fiber optic cable, twisted pair cabling, or digital subscriber line (DSL), and/or wireless technologies such as infrared light, radio waves, or microwaves, at least one of these hardwired technologies and wireless technologies is included in the definition of "transmission medium".

The information, signals, and the like described in the present disclosure may be expressed using any of a variety of different techniques. For example, data, instructions, commands, information, signals, bits, symbols, chips, and the like that may be referred to throughout all of the foregoing descriptions may be expressed by voltages, currents, electromagnetic waves, magnetic fields or magnetic particles, photo fields or photons, or any desired combination thereof.

Note that a term that has been described in the present disclosure and a term needed to understand the present disclosure may be replaced by a term that has the same or similar meaning.

Also, information, a parameter, or the like that has been described in the present disclosure may be represented by an absolute value, by a relative value from a predetermined value, or by other corresponding information.

The phrase "based on" used in the present disclosure does not mean "based only on" unless specifically mentioned. In other words, the phrase "based on" means both "based only on" and "based at least on".

Any reference to an element for which a phrase such as "first" or "second" that is used in the present disclosure is used does not generally limit the amount or order of such an element. These phrases may be used in the present disclosure as a convenient method for distinguishing between two or more elements. Therefore, the reference to first and second elements does not mean that only the two elements are adopted, or the first element must precede the second element in any form.

The "unit" in the configuration of each apparatus described above may be replaced by a "means", a "circuit", a "device", or the like.

In the present disclosure, when terms "include" and "including" and a variety of these are used, these terms are intended to be comprehensive similarly to the term "comprising". Moreover, the term "or" used in the present disclosure is intended to be not exclusive OR.

When an article such as a, an, or the in English is added by translation in the present disclosure, for example, the present disclosure may include a case where a noun following these articles is a plural.

In the present disclosure, the phrase "A and B are different" may mean "A and B are different from each other". This phrase may mean that "A and B are each different from C". Terms such as "away" and "coupled" may be construed in a similar manner as "different".

REFERENCE SIGNS LIST

1 Flight system
10, 10a, 10b Flying vehicle
11a Capturing unit
12b Light-emitting unit
1001 Processor
1002 Memory
1003 Storage
1004 Communication apparatus
1005 Input apparatus
1006 Output apparatus
1007 Flying apparatus
1008 Sensor
1009 Positioning apparatus
20 Server apparatus
21 Acquiring unit
22 Control unit
2001 Processor
2002 Memory
2003 Storage
2004 Communication apparatus
2005 Input apparatus
2006 Output apparatus
F Road extending direction
C Image capturing direction
R Road surface
G Level difference
L Sun
B Sunlight
S Shadow

What is claimed is:

1. An information processing apparatus comprising:
a control unit that acquires a weather forecast for an inspection day of a road, and controls, in accordance with a position of the sun and an amount of sunlight estimated from the weather forecast, a first flying vehicle and a second flying vehicle, the first flying vehicle capturing an image of a surface of the road, the second flying vehicle emitting light onto the surface, such that a spot where a level difference is estimated, in advance, to occur on the surface, an image capturing direction in which the first flying vehicle captures an image of the spot, and a light emitting direction in which the second flying vehicle or the sun emits the light onto the spot have a relationship that causes, when the level difference exists, a shadow to occur at the spot and the shadow to be captured;
wherein the control unit controls, when sunlight is at a predetermined amount or more, the first flying vehicle such that the spot, the image capturing direction in which the first flying vehicle captures the image of the spot, and a sunlight direction at the spot have a relationship that causes, when the level difference exists, a shadow to occur at the spot and the shadow to be captured; and
the control unit controls, when the sunlight is at the predetermined amount or more, and control fails to be performed such that the spot, the image capturing direction in which the first flying vehicle captures the image of the spot, and the sunlight direction at the spot have the relationship that causes, when the level difference exists, the shadow to occur at the spot and the shadow to be captured, or when the sunlight is at less than the predetermined amount, the first flying vehicle and the second flying vehicle such that the spot, the image capturing direction in which the first flying vehicle captures the image of the spot, and the light emitting direction in which the second flying vehicle emits the light onto the spot have the relationship that causes, when the level difference exists, the shadow to be occur at the spot and the shadow to be captured.

2. The information processing apparatus according to claim 1,
wherein the control unit controls, when the sunlight is at the predetermined amount or more, and the control fails to be performed such that the spot, the image capturing direction in which the first flying vehicle captures the image of the spot, and the sunlight direction at the spot have the relationship that causes, when the level difference occurs, the shadow to occur at the spot and the shadow to be captured, or when the sunlight is at less than the predetermined amount, an amount of the light emitted from the second flying vehicle to the spot in accordance with an amount of the sunlight or the sunlight direction at the spot.

3. The information processing apparatus according to claim 1,
wherein the spot where the level difference is estimated, in advance, to occur on the surface is a joint of a paved road surface.

4. The information processing apparatus according to claim 1,
wherein the control unit controls the first flying vehicle and the second flying vehicle to fly along a flight path in a direction in which the road extends and subsequently controls the first flying vehicle and the second flying vehicle to fly along the flight path in an opposite direction.

* * * * *